March 15, 1966 H. E. JONES 3,241,078

DUAL OUTPUT SYNCHRONOUS DETECTOR UTILIZING
TRANSISTORIZED DIFFERENTIAL AMPLIFIERS

Filed June 18, 1963

INVENTOR.
HOWARD E. JONES

BY Roger W. Jensen

ATTORNEY

United States Patent Office 3,241,078
Patented Mar. 15, 1966

3,241,078

DUAL OUTPUT SYNCHRONOUS DETECTOR UTILIZING TRANSISTORIZED DIFFERENTIAL AMPLIFIERS

Howard E. Jones, Columbia Heights, Minn., assignor to Honeywell Inc., a corporation of Delaware Filed June 18, 1963, Ser. No. 288,792
7 Claims. (Cl. 329—50)

This invention is concerned with demodulators in general and more particularly with transformerless demodulators.

The prior art was not particularly concerned with omitting transformers since in many instances the individual tubes used were larger than the transformers themselves. Even when transistors were first used, the cases of the transistors were not particularly smaller than the transformers that could be used. At the present time, however, microminiaturization of circuits has enabled the production of entire circuits so many times smaller than one transformer that it is almost a necessity to design circuits which omit the use of transformers of any kind. The present invention encompasses both full and half wave embodiments of a transformerless demodulators. By definition the terms full and half wave in this specification refer to the output signal obtained between one of the output terminals and ground or a reference potential as opposed to between the two output terminals.

It is an object of this invention to provide circuitry which will demodulate a signal wherein no transformers are required.

Figure 1:
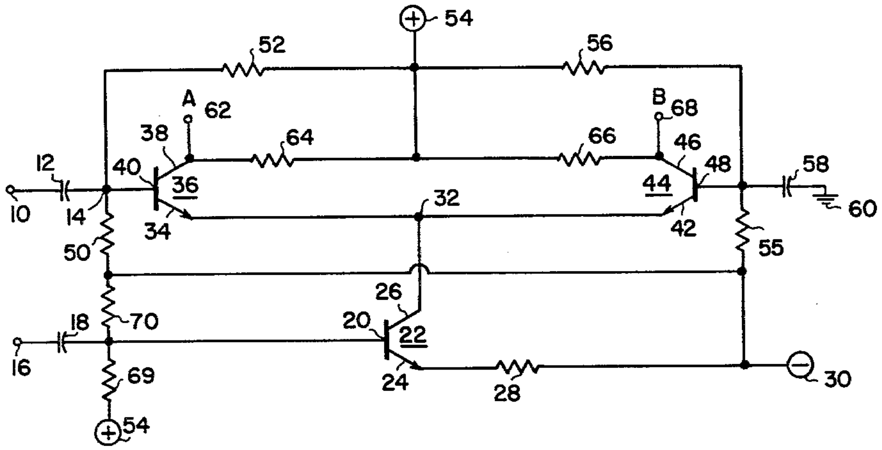
Figure 2:
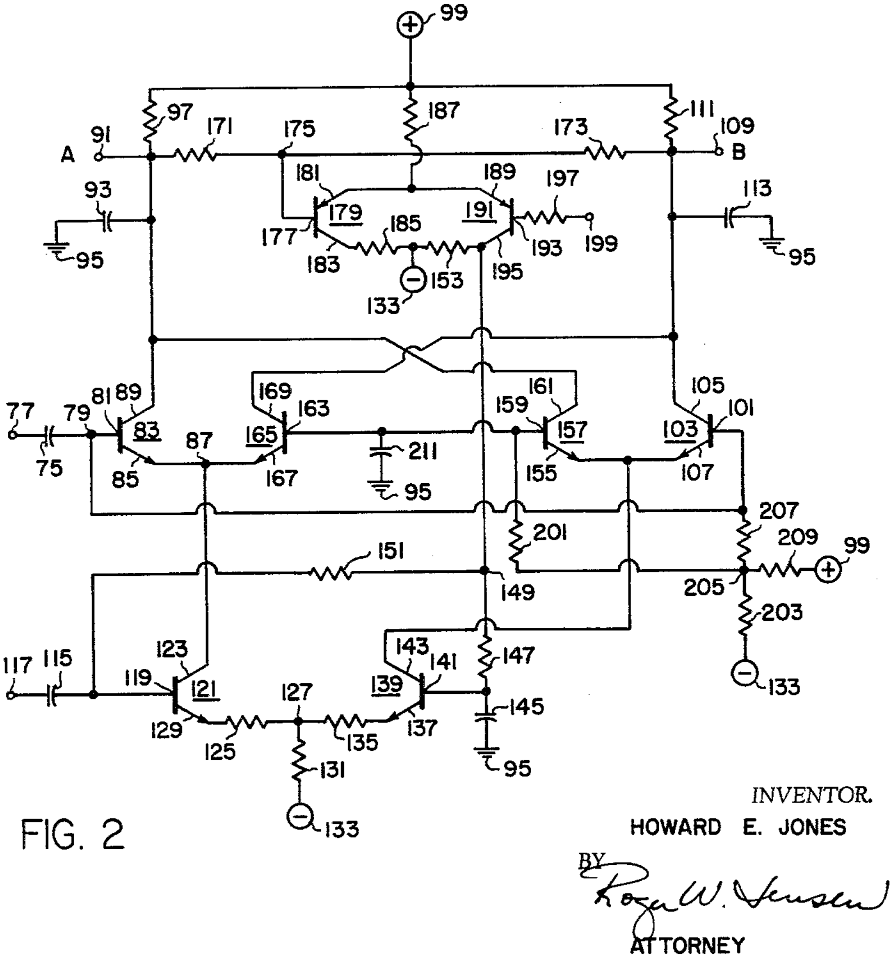

Further objects and advantages of this invention will become apparent from a reading of the specification and the appended claims in conjunction with the drawings in which:

FIGURE 1 is a simplified circuit diagram of a half wave embodiment of the invention; and FIGURE 2 is a detailed circuit diagram of a full wave embodiment of the invention wherein the direct voltage levels of the output terminals are held at equal amplitudes but opposite polarities with respect to ground.

In FIGURE 1, an input terminal generally designated as 10 is used to provide an input reference switching signal which is in the form of an alternating signal. A capacitor or capacitive means 12 is connected between input 10 and a junction point 14. An input terminal 16 supplies an input signal to be demodulated to the apparatus of FIGURE 1. A capacitor or capacitive means 18 is connected between input terminal 16 and a base 20 of a transistor generally designated as 22 having an emitter 24 and a collector 26. A resistive means or impedance means 28 is connected between emitter 24 and a negative power terminal or power supply means 30. Collector 26 is connected to a junction point 32 which is further connected to an emitter 34 of a transistor generally designated as 36 having a collector 38 and a base 40. The junction point 32 is also connected to an emitter 42 of a transistor generally designated as 44 having a collector 46 and a base 48. The base 40 of transistor 36 is connected to junction point 14. A resistor or impedance means 50 is connected between the junction point 14 and the negative power terminal 30. A resistive means or impedance means 52 is connected between the junction point 14 and a positive power terminal or power supply means 54. The resistors 50 and 52 form a voltage dividing network or bias network for the transistor 36. A resistive means or impedance means 55 is connected between base 48 of transistor 44 and the negative power terminal 30. Another resistive means 56 is connected between base 48 and the positive power terminal means 54. A capacitive means or capacitor 58 is connected between the base 48 and ground or reference potential means 60. The collector 38 of transistor 36 is connected to an output terminal designated both as A and as terminal 62. A resistive means or impedance means 64 is connected between terminal 62 and positive power terminal 54. A resistor or impedance means 66 is connected between positive power terminal means 54 and the collector 46 of transistor 44. An output terminal 68, which is also designated as B, is connected to collector 46 of transistor 44. The transistors 36 and 44 are of the NPN type in FIGURE 1 but, as will be realized, may be of opposite polarity type with opposite polarities applied to the power terminals 30 and 54. The transistors 36 and 44 may also be designated together as reversing switch means or simply as switching means, valve means, amplifying means, and voltage or current directing means. The transistor 22, which is shown as an NPN type, can also be reversed in polarity type along with the other two transistors previously mentioned as long as the input polarity voltage is changed. This transistor also may be variously termed as a valve means, amplifying means, switching means, or current or voltage sensitive means.

In FIGURE 2, a capacitor or capacitive means 75 is connected between a reference signal input terminal 77 and a junction point 79. Junction point 79 is connected to a base 81 of a valve means, switching means, amplifying means, or current directing means, or NPN transistor means 83. Transistor 83 has an emitter 85 connected to a junction point 87 and a collector 89 connected to an output terminal 91 which is further designated as A. A capacitor 93 is connected between terminal 91 and reference potential or ground 95. A resistive or impedance means 97 is connected between terminal 91 and a positive power terminal or positive power supply means 99. Junction point 79 is also connected to a base 101 of a transistor generally designated as 103 having a collector 105 and an emitter 107. Transistor 103 which is shown as an NPN transistor may also be designated as a valve means, switching means, amplifying means, voltage sensitive means, or current directing means. These various designations may also be applied to the rest of the transistors described in this embodiment. Through the rest of the specification, the various transistors will only be designated as transistors but it will be understood that the term transistor includes the rest of the designations previously mentioned. The collector 105 is further connected to an output 109 which is also designated as B. A resistive means or impedance means 111 is connected between power terminal 99 and output terminal 109. A capacitive means or capacitor 113 is connected between output terminal 109 and ground or reference potential 95. A capacitor or capacitive means 115 is connected between a signal input terminal 117 and a base 119 of an NPN transistor generally designated as 121. An input signal to be demodulated is applied to terminal 117. A collector 123 of transistor 121 is connected to the junction point 87. A resistor or impedance means 125 is connected between a junction point 127 and an emitter 129 of the transistor 121. A further resistance or impedance means 131 is connected between the junction point 127 and a negative power terminal or power supply means 133. A resistance or impedance means 135 is connected between the junction point 127 and an emitter 137 of an NPN transistor generally designated as 139 and further having a base 141 and a collector 143. A capacitive means 145 is connected between the base 141 of transistor 139 and ground potential 95. A resistor or impedance means 147 is connected between base 141 and a junction point 149. A further resistance or impedance means 151 is connected between base 119 of transistor 121 and junction point 149. Junction point 149 is connected to power terminal 133 through a resistance or impedance means 153. Collector 143 of transistor 139 is connected to emitter 107 of transistor 103 and also to an emitter 155 of a NPN transistor generally designated as 157 and further including a base 159 and a collector 161. The collector 161 of transistor 157 is connected to the output terminal 91. The base 159 is further connected to a base 163 of a NPN transistor generally designated as 165. Transistor 165 also has an emitter 167 and a collector 169. Emitter 167 is connected to junction point 87 while collector 169 is connected to output terminal 109. Two resistors 171 and 173 are connected in series between output terminals 91 and 109 and have a junction point 175 between them. Junction point 175 is connected to a base 177 of a PNP transistor generally designated as 179 and further including an emitter 181 and a collector 183. A resistance or impedance means 187 is connected between positive power terminal means 99 and emitter 181 of transistor 179. Emitter 181 is also connected to an emitter 189 of a PNP transistor generally designated as 191 and further having a base 193 and a collector 195. Collector 195 is connected to junction point 149. A resistive means 197 is connected between base 193 and a voltage reference terminal 199. Two resistors 201 and 203 are connected in series between base 159 of transistor 157 and negative power terminal means 133. A junction point 205 is situated between the resistors 201 and 203. Two resistors 207 and 209 have one end connected to junction point 205 while the other end of resistor 207 is connected to junction point 79 and the other end of resistor 209 is connected to positive power terminal means 99. A capacitor 211 is connected between ground 95 and base 159 of transistor 157.

*Operation*

In FIGURE 1, it may be assumed that the input signal to be demodulated and the reference or switching signal are in phase. The input signal to be demodulated is applied at input terminal 16 while the reference or switching signal is applied at input terminal 10. It will be realized that each of these input signals are being applied with respect to ground 60. For highest accuracy, the input signal or switching signal applied at input 10 will switch the transistors 36 and 44 completely ON or completely OFF while the input signal to be demodulated will never be large enough to turn transistor 22 completely ON or completely OFF. If the input signal and the reference signal are positive with respect to ground, the transistors 22 and 36 will turn further ON. Since transistor 36 will turn completely ON, the output terminal A will effectively be connected to collector 26 of transistor 22 and for one half cycle will provide an output indicative of the amplitude or potential of collector 26 which will vary in accordance with the input signal applied at terminal 16. During this same half cycle due to the differential action of transistors 36 and 44, the transistor 44 will be turned to an OFF condition thereby holding output terminal B at the positive potential of power supply terminal 54. On the next half cycle, the switching or reference signal will turn transistor 36 to an OFF condition and thereby turn transistor 44 to an ON condition. The negative going input signal will be such as to cause the collector 26 of transistor 22 to swing in a negative direction and output terminal B will follow collector 26. On the third half cycle, transistor 36 will again switch to an ON condition and allow the output terminal 62 to follow the collector 26 of transistor 22. It can thus be seen that terminal A or 62 is receiving the alternate positive half cycles of the input signals while terminal B or 68 is receiving the negative half cycles. Therefore, terminal 62 is always positive with respect to terminal 68 since the successive half cycles of the input signals are switched from one output terminal to the other. When the reference switching signal and the input signal are 180° out of phase, terminal 68 will always be positive with respect to terminal 62. In this way the demodulating action is obtained. In somewhat different words, the demodulation action is obtained by switching the input signal from one terminal to the other on successive half cycles through the action of switching transistors 36 and 44 so that with the same phase signals for input and reference switching signal, the same terminal will always stay positive with respect to the other terminal.

FIGURE 2 illustrates a full wave demodulator incorporating in addition a circuit to keep the output terminals 91 and 109 at equal potentials above and below ground potential 95. For convenience it may be assumed that the reference switching signal and the input signal to be demodulated are of the same phase and applied to input terminals 77 and 117 respectively. The reference switching signal when applied to input 77 turns transistors 83 and 103 to an ON condition at the same time. The differential action of their respective circuits turn transistors 165 and 157 to an OFF conidtion at this time. When the input signal goes in the negative direction transistors 83 and 103 are turned to an OFF condition and accordingly transistors 165 and 157 turn to an ON condition. This action is similar to that provided by a reversing switch which could be used to perform the same function. It will be noted that one transistor of each of the differential amplifier pairs is connected to a corresponding transistor in the other differential pair. Transistors 121 and 139 are also connected to provide a differential action. This differential amplifier is somewhat different than many differential amplifiers in that resistors 125 and 135 are inserted between the emitters to stabilize the gain of this stage at a lower value than what would occur without these stabilizing resistors. The values of these two resistors 125 and 135 are much lower comparatively than the resistance of resistor 131. When an input signal is applied to input terminal 117 and advances in the positive direction, transistor 121 is turned further ON while transistor 139 is turned toward the OFF condition. As it was assumed originally that the input signal is in phase with the reference switching signal, the action of transistor 121 turning toward an ON condition will be applied to the output 91 through transistor 83 which is in an ON condition. The action of transistor 139 turning toward an OFF condition is applied to output terminal 109 through transistor 103. This switching action in this first half cycle places the output terminal 91 at a negative going potential and the terminal 109 at a positive going potential. On the next half cycle, transistors 83 and 103 are turned to an OFF condition and transistors 157 and 165 are turned to an ON condition. On this half cycle the input signal causes transistor 121 to turn toward an OFF condition while transistor 139 is turned toward an ON condition. In this half cycle the action of transistor 121 turning toward an OFF condition is applied through transistor 165 to output terminal 109 while the action of transistor 139 turning toward an ON condition is applied through transistor 157 to output terminal 91. It can thus be seen that on both half cycles, output terminal 91 is held at a negative going potential while output terminal 109 is held at a positive potential. It may be determined from following through the switching arrangement that when the input and reference switching signal are 180° out of phase, the switching transistors will cause output terminal 109 to be negative with respect to output terminal 91. As will be realized, the output terminals 91 and 109 both vary in voltage due to the changing amplitude of the input signal on each half cycle while in FIGURE 1 the input signal was switched from one output terminal to the other so that each output terminal only varied in voltage in response to the input signal on alternate half cycles.

Where the output signal does not need to be referenced to ground, the above described portions of the circuit are the only components needed in addition to the biasing resistors and the filter capacitors. If, however, it is desired to keep output terminals 91 and 109 at equidistant or other desired potentials above and below ground or some other reference potential, the additional error detection or bias adjusting circuitry utilizing transistors 179 and 191 may be used. These transistors sense the median voltage between the two output terminals and compare it with a reference voltage to adjust the bias current to transistors 121 and 139 and thereby control the voltage level at the output terminals 91 and 109. If the two resistors 171 and 173 are of equal resistance value the opposite going output signals between points A and B will cancel completely and the bias or steady state voltages at outputs A and B will provide the error signal. In instances where it may be desirable to use different values for resistors 171 and 173, it must be realized that the output signals will not cancel and thus the bias levels of transistors 121 and 139 will be affected to change the steady state voltage at points A and B. The effect on these transistors will of course depend on the phase of the input with respect to the signal to be demodulated. If junction point 179 between resistors 171 and 173 is at ground potential and if resistors 171 and 173 are of equal resistance value, it will be realized that the output terminals 91 and 109 are at equipotential points above and below ground. In this condition, if the reference voltage applied at terminal 199 is ground, there will be no change in the current flowing through transistor 191 and accordingly the bias current to transistors 121 and 139 will remain unchanged. If however the potential at 175 rises with respect to ground, this will turn transistor 179 toward the OFF condition and the differential amplifier action will turn transistor 191 further ON. This action of transistor 191 will allow more bias current to flow to transistors 121 and 139 thereby turning them further ON in their class A biased condition. Since both transistors 121 and 139 are turned further toward the ON condition, the potential at output terminals 91 and 109 are both lowered. This lowering of the potential at the output terminals therefore lowers the potential at junction point 175 until there is a minimum voltage variation from ground at junction point 175. This minimum amount will be determined both by the gain of the detection stage and by the voltage of the reference potential applied to terminal 199.

While the circuit has been mainly described as providing an output between terminal A and B, the circuit is also designed to provide a full wave output between either terminal of FIGURE 2 and ground or other reference potential.

It will be realized that this voltage detection circuit for equalizing or adjusting the voltage at the output terminals with respect to ground or some other reference potential may be used by one skilled in the art to adjust the output voltage at terminals 62 and 68 in FIGURE 1. Since the output signals will not cancel in this embodiment, it will normally be necessary to add a filter network to the input of the detection circuitry.

While transistors have been used to illustrate the invention, it will be realized that although the invention is directed toward microminiaturized circuits, electronic tubes may also be used to practice this invention wherever it may be desired to eliminate transformers. The invention is not limited to the two embodiments shown but is to include any similar transformerless demodulators which fall within the scope of the appended claims wherein I claim.

1. Transformerless demodulator apparatus comprising, in combination:

input signal supplying means for supplying an input signal to be demodulated;

means for supplying a reference signal;

power supplying means for supplying power to said demodulator apparatus, said power supplying means including positive, negative and ground terminal means;

first transistor means including base, emitter and collector means, said base means being connected to said input signal supplying means and said emitter means being connected to said negative terminal means;

second transistor means including base, emitter and collector means;

means connecting said emitter means of said first and second transistor means together, connecting said base means of said second transistor means to said ground means, and said first and second transistor means thereby forming an amplifier whereby said second transistor means conducts less as said first transistor means conducts more in response to an input signal of the proper polarity from said input signal supplying means;

first and second output means;

first, second, third and fourth switching means, each of said switching means being connected to said reference signal supplying means for switching in response to the reference signal, said first and fourth switching means being nonconductive when said second third means are conductive;

means connecting said first output means and said first switching means in series between said positive terminal means and said collector means of said first transistor means;

means connecting said second output means and said second switching means in series between said positive terminal means and said collector means of said first transistor means;

means connecting said third switching means between said first output means and said collector means of said second transistor means;

means connecting said fourth switching means between said second output means and said collector means of said second transistor means;

reference potential means; and detection means connected to said first and second output means of the demodulator apparatus and to said reference potential means, said detection means being further connected to supply bias currents to said first and said second transistor means, and said detection means being adapted to vary said bias currents to hold said first and second output means at equiamplitude potentials above and below said reference potential.

2. Transformerless demodulator apparatus comprising, in combination:

input signal supplying means for supplying an input signal to be demodulated;

means for supplying a reference signal;

first current sensitive means including input and output means, said input means being connected to said input signal supplying means;

second current sensitive means including input and output means;

means connecting said first and second current sensitive means together to form a difference amplifier;

first and second demodulator output means;

first, second, third and fourth switching means, each of said switching means being connected to said reference signal supplying means for switching in response to the reference signal, said first and fourth switching means being nonconductive when said second and third means are conductive;
means connecting said first switching means in series between said first demodulator output means and said output means of said first current sensitive means;
means connecting said second switching means in series between said second demodulator output means and said output means of said first current sensitive means;
means connecting said third switching means between said first demodulator output means and said output means of said second current sensitive means; and
means connecting said fourth switching means between said second demodulator output means and said output means of said second current sensitive means.

3. Transformerless demodulator apparatus comprising, in combination:
input signal supplying means for supplying an input signal to be demodulated;
means for supplying a reference signal;
differential amplifier means including input means and first and second output means, said input means being connected to said input signal supplying means;
first and second demodulator output means;
first, second, third and fourth switching means, each of said switching means being connected to said reference signal supplying means for switching in response to the reference signal, said first and fourth switching means being nonconductive when said second and third means are conductive;
means connecting said first switching means in series between said first demodulator output means and said first output means of said differential amplifier means;
means connecting said second switching means in series between said second demodulator output means and said first output means of said differential amplifier means;
means connecting said third switching means between said first demodulator output means and said second output means of said differential amplifier means; and
means connecting said fourth switching means between said second demodulator output means and said second output means of said differential amplifier means.

4. Demodulating apparatus of the class described comprising, in combination:
input signal supplying means for supplying an input signal to be demodulated;
amplifying means including first and second output means, and input means, said input means being connected to said input signal supplying means for receiving the input signal therefrom, and said amplifying means providing a push-pull output signal between said first and second output means of said amplifying means;
first and second output terminal means for providing a demodulated output signal;
reference signal supplying means for supplying a reference signal; and
switching means connected to said reference signal supplying means for receiving the reference signal therefrom, said switching means also being connected between said first and second output means of said amplifying means and said first and second output terminal means, said switching means connecting said first and second output means of said amplifying means to said first and second output terminal means respectively on alternate half cycles of the reference signal, and said first and second output means of said amplifying means being connected respectively to said second and first output terminal means on said remaining half cycles of the reference signal.

5. Demodulating apparatus of the class described comprising, in combination:
input signal supplying means for supplying an input signal to be demodulated;
differential amplifying means including first and second output means, and input means, said input means being connected to said input signal supplying means for receiving the input signal therefrom, said differential amplifying means providing an output signal between said first and second output means of said differential amplifying means;
first and second output terminal means for providing a demodulated output signal;
reference signal supplying means for supplying a switching reference signal; and
reversing switch means connected to said reference signal supplying means for receiving the switching reference signal therefrom, said reversing switch means also being connected between said first and second output means of said differential amplifying means and said first and second output terminal means, said reversing switch means connecting said first and second output means of said differential amplifying means to said first and second output terminal means respectively on alternate half cycles of the switching reference signal, and reversing the electrical connections on the other half cycles of the switching reference signal.

6. Demodulating apparatus of the class described comprising, in combination:
reversing switch means including input means, output means, and control means, said reversing switch means reversing the connections of said input means to said output means as a function of an input being applied to said control means;
control signal means connected to said control means of said reversing switch means for applying a control input signal thereto;
means for supplying an input signal to be demodulated;
differential amplifier means including input and output means, said input means of said differential amplifier means being connected to said means for supplying an input signal to be demodulated for receiving a signal therefrom, and said output means of said differential amplifier means being connected to said input means of said reversing switch means; and
detection means connected between said output means of said reversing switch means and said input means of said differential amplifier means, said detection means providing an output biasing current in response to steady state voltages appearing at said output means of said reversing switch means, and the biasing current being applied to said differential amplifier means for adjusting the steady voltages appearing at said output means of said reversing switch means toward a predetermined voltage level.

7. Demodulating apparatus of the class described, comprising, in combination:
switch means including input means, output means, and control means, said switch means alternately connecting said input means to said output means as a function of an input being applied to said control means;
control signal means connected to said control means of said switch means for applying a control input signal thereto;
means for supplying an input signal to be demodulated;
adjustable bias level amplifier means including input and output means, said input means of said amplifier means being connected to said means for supplying an input signal to be demodulated for receiving a signal therefrom, the bias level of said amplifier means varying in response to an input applied thereto, and said output means of said amplifier means being connected to said input means of said switch means; and
bias adjusting means connected to said switch output means and said amplifier means, said bias adjusting means varying the bias level of said amplifier means toward a predetermined level.

References Cited by the Examiner

UNITED STATES PATENTS

| | | | |
|---|---|---|---|
| 2,651,718 | 9/1953 | Levy | 328—153 |
| 3,154,749 | 10/1964 | Perkins | 329—169 |
| 3,183,373 | 5/1965 | Sakurai | 307—88.5 |

OTHER REFERENCES

Schuster: A Phase Sensitive Detector Circuit Having High Balance Stability, Review of Scientific Instruments, vol. 22, Issue 4, April 1951, pages 254–255.

HERMAN KARL SAALBACH, *Primary Examiner.*

ROY LAKE, *Examiner.*

P. L. GENSLER, *Assistant Examiner.*